United States Patent [19]

Aoi

[11] Patent Number: 4,647,982
[45] Date of Patent: Mar. 3, 1987

[54] IMAGE DISPLAY APPARATUS CAPABLE OF STARTING DISPLAY OF A NEW IMAGE IN RESPONSE TO DESIGNATION THEREOF PRIOR TO COMPLETION OF DISPLAY OF A PREVIOUSLY DESIGNATED IMAGE

[75] Inventor: Shigeru Aoi, Yokohama, Japan

[73] Assignee: Canon Kabushiki Kaisha, Tokyo, Japan

[21] Appl. No.: 815,678

[22] Filed: Jan. 2, 1986

Related U.S. Application Data

[63] Continuation of Ser. No. 511,178, Jul. 6, 1983, abandoned.

[30] Foreign Application Priority Data

Jul. 9, 1982 [JP] Japan ............................. 57-119344

[51] Int. Cl.[4] .................. H04N 1/21; H04N 1/23; G01D 15/06
[52] U.S. Cl. .................................. 358/296; 346/150; 346/153.1; 364/518
[58] Field of Search .............. 346/139 R, 150, 153.1, 346/74.2, 160; 358/296, 300–302; 355/5, 14 R; 340/723, 724, 792, 802, 825.26; 364/518, 519, 521

[56] References Cited

U.S. PATENT DOCUMENTS

| 3,493,956 | 2/1970 | Andrews et al. | 340/792 X |
| 3,641,585 | 2/1972 | Hodges | 358/301 X |
| 4,273,439 | 6/1981 | Markham et al. | 355/14 R X |
| 4,387,424 | 6/1983 | Frediani et al. | 364/200 |

OTHER PUBLICATIONS

"The Architecture of an Electronic Book", Murray et al, IEEE Trans. on Ind. Elect., vol. IE-29, No. 1, Feb '82, pp. 82–91.

Primary Examiner—E. A. Goldberg
Assistant Examiner—Patrick W. Foster
Attorney, Agent, or Firm—Fitzpatrick, Cella, Harper & Scinto

[57] ABSTRACT

An image output apparatus comprises an image information supply unit, an output unit for causing any image information to be put out from the supply unit, a designating device for designating an image to be put out from the image information of the supply unit, a command device for commanding a change of the designated image, and a control device whereby, when a designated image change command is given before the outputting of a previously designated image is completed, the outputting of the previously designated image is stopped and the outputting of a newly designated image is started.

4 Claims, 7 Drawing Figures

IMAGE DISPLAY APPARATUS CAPABLE OF STARTING DISPLAY OF A NEW IMAGE IN RESPONSE TO DESIGNATION THEREOF PRIOR TO COMPLETION OF DISPLAY OF A PREVIOUSLY DESIGNATED IMAGE

This application is a continuation of application Ser. No. 511,178 filed July 6, 1983, now abandoned.

BACKGROUND OF THE INVENTION

1. Field of the Invention

This invention relates to an image output apparatus, and particularly to an image output apparatus which is capable of arbitrarily putting out a desired image stored in a memory unit or the like. Here, the term "output" includes not only putting out electrical signals but also putting out visible images, such as for displaying or printing.

2. Description of the Prior Art

Heretofore, in an image output apparatus as described above, when a desired image is to be searched and put out from a great deal of image information, the searching operating or the searching time has sometimes been greatly affected by the output speed of output means. For example, a display device in the form of an endless belt for reproducing image information input in the form of an electrical signal as a visible image on a display sheet, used as the output means has the advantage, when compared to a display device using a cathode ray tube or liquid crystal, that it can accomplish high density display, while it has suffered from the disadvantage that the speed of movement of the display sheet is slow and therefore the speed at which the image signal is converted into a visible image, namely, the display speed, is slow. Moreover, the display device does not advance to the display of the next pictorial image until after a prior pictorial image have been completely displayed. Accordingly, where the amount of information corresponding to an image is considerable and a desired image is to be searched from a great deal of image information, if the separation of the desired image is not clear, the search therefore has not been easy and a long searching time has been required.

SUMMARY OF THE INVENTION

It is an object of the present invention to provide an image output apparatus which enables a desired image to be easily searched from a great deal of image information and can shorten the searching time.

The present invention achieves the above object with an image output apparatus comprising image information supply means, output means for causing any image information to be put out from the supply means, designating means for designating an image to be put out from the image information of the supply means, command means for commanding a change of the designated image, and control means whereby, when there is a command before the outputting of the designated image is completed, the outputting of the previously designated image is stopped and the outputting of a new designated image is started.

The invention will become more fully apparent from the following detailed description thereof taken in conjunction with the accompanying drawings.

DESCRIPTION OF THE PREFERRED EMBODIMENTS

Figure 1:
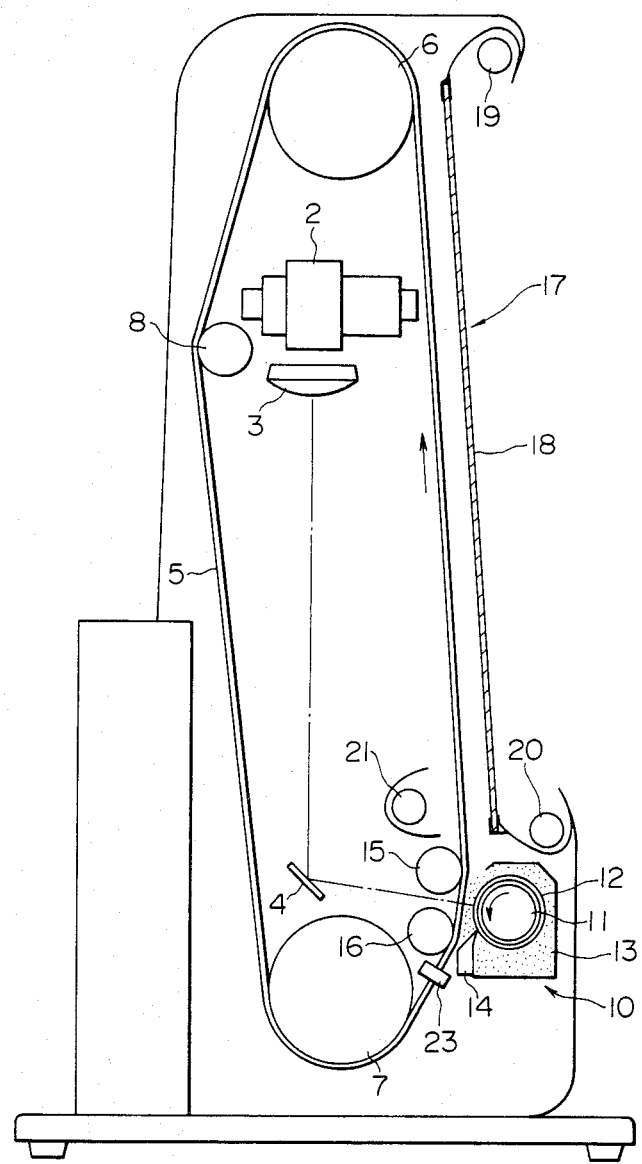
FIG. 1 is a cross-sectional view showing a display device which is an example of the output means of the present invention.
Figure 2:
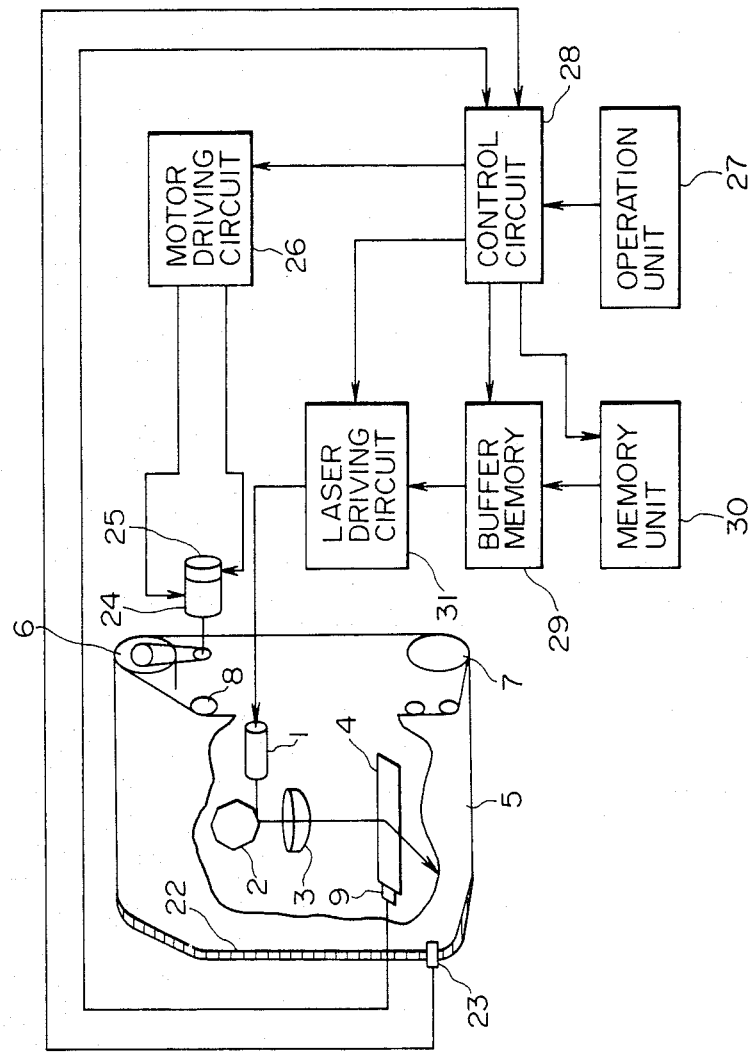
FIG. 2 is a block diagram showing an embodiment of the present invention.

FIG. 1 shows an example of the display device applicable to the present invention, and FIG. 2 shows an embodiment of the present invention which uses the display device of FIG. 1.

The output light of a semiconductor laser 1 (FIG. 2) modulated by image signals is scanned from the front to the back of FIG. 1 by a scanner 2 and is projected onto the back side of a display sheet 5 in the form of an endless belt through an f·θ lens 3 and via a mirror 4. The display sheet 5 comprises a polyethylene terephthalate film rendered conductive by providing a thin film of indium-tin-oxide thereon and cadmium-sulfide applied to the surface of the polyethylene-terephthalate film with resin as a binder. Thus, the display sheet 5 is endowed with photosensitivity, and is passed over rollers 6, 7 and 8 and is movable in the direction of the arrow. As cadmium-sulfide, use is made of one doped with copper and indium and having photosensitivity to near the infrared ray range emitted from the semiconductor laser 1. A beam detecting sensor 9 is provided on the mirror 4, as shown in FIG. 2. A developing device 10 is provided in opposed relationship to the exposure position of the display sheet 5. The developing device 10 is provided with a sleeve 12 having a magnet 11 therein. The magnet 11 is rotatable in the direction of the arrow. Toner 13 having conductivity and magnetism which is supplied to the surface of the sleeve 12 is controlled to a uniform thickness by a blade 14 and comes into contact with the display sheet 5. Thus, an electrical latent image formed on the display sheet 5 is developed. The width of the area in which the toner 13 is in contact with the surface of the display sheet 5 is much greater than the width of the laser beam scan and therefore, the contact of the toner with the surface of the display sheet is continuedly effected even after the exposure by the laser beam has been terminated.

A DC voltage is applied between the sleeve 12 and the polyethylene terephthalate film of the display sheet 5 by a DC voltage source (not shown). Rollers 15 and 16 are provided near the positions whereat exposure and development are effected, whereby the display sheet 5 is kept smooth and the spacing between the surface of the display sheet 5 and the sleeve 12 is accurately kept constant. A visible image formed on the display sheet 5 at a position opposed to the developing device 10 is transported to a display portion 17 and displayed through a glass 18.

Lamps 19 and 20 illuminate the surface of the display sheet 5 to thereby make the visible image easy to see and also erase the history formed by an electric field received during the image forming process. A lamp 21 serves to erase the history on the display sheet 5 and is turned on only during the time when the display sheet 5 is moved, and is turned off when the display sheet 5 is stopped.

When the display content is to be altered, the display sheet 5 is again moved and is reused intact with a visible image formed thereon. In this case, the previous visible image is erased by a new latent image being formed and does not adversely affect the next visible image formation. Therefore, cleaning means need not be additionally provided. The edge of the display sheet 5, as shown in FIG. 2, is printed with a stripe pattern 22 for detecting its movement, and a photo-interrupter 23 generates clock pulses in accordance with the stripe pattern 22.

In FIG. 2, a motor 24, a brake 25 and a motor driving circuit 26 together constitute an example of display sheet driving means. Reference numeral 27 designates an operation unit including page designating means and preceding and succeeding page designating means, reference numeral 28 denotes a control circuit, reference numeral 29 designates a buffer memory for storing therein the image signals of a designated page and the pages before and after the designated page from a memory unit 30, and reference numeral 31 denotes a laser driving circuit which, with the semiconductor laser 1, the scanner 2, the f·θ lens 3, the mirror 4, the sensor 9 and the developing device 10, constitutes an example of image forming means.

In the present embodiment, the display device comprising the display sheet, the image forming means and the display sheet driving means corresponds to the output means of the appended claims, and the page designating means and the preceding and succeeding page designating means correspond to the designating means and the command means, respectively, of the appended claims. Also, the memory unit and the buffer memory together constitute image information supply means, and the control circuit corresponds to control means.

Figure 3:
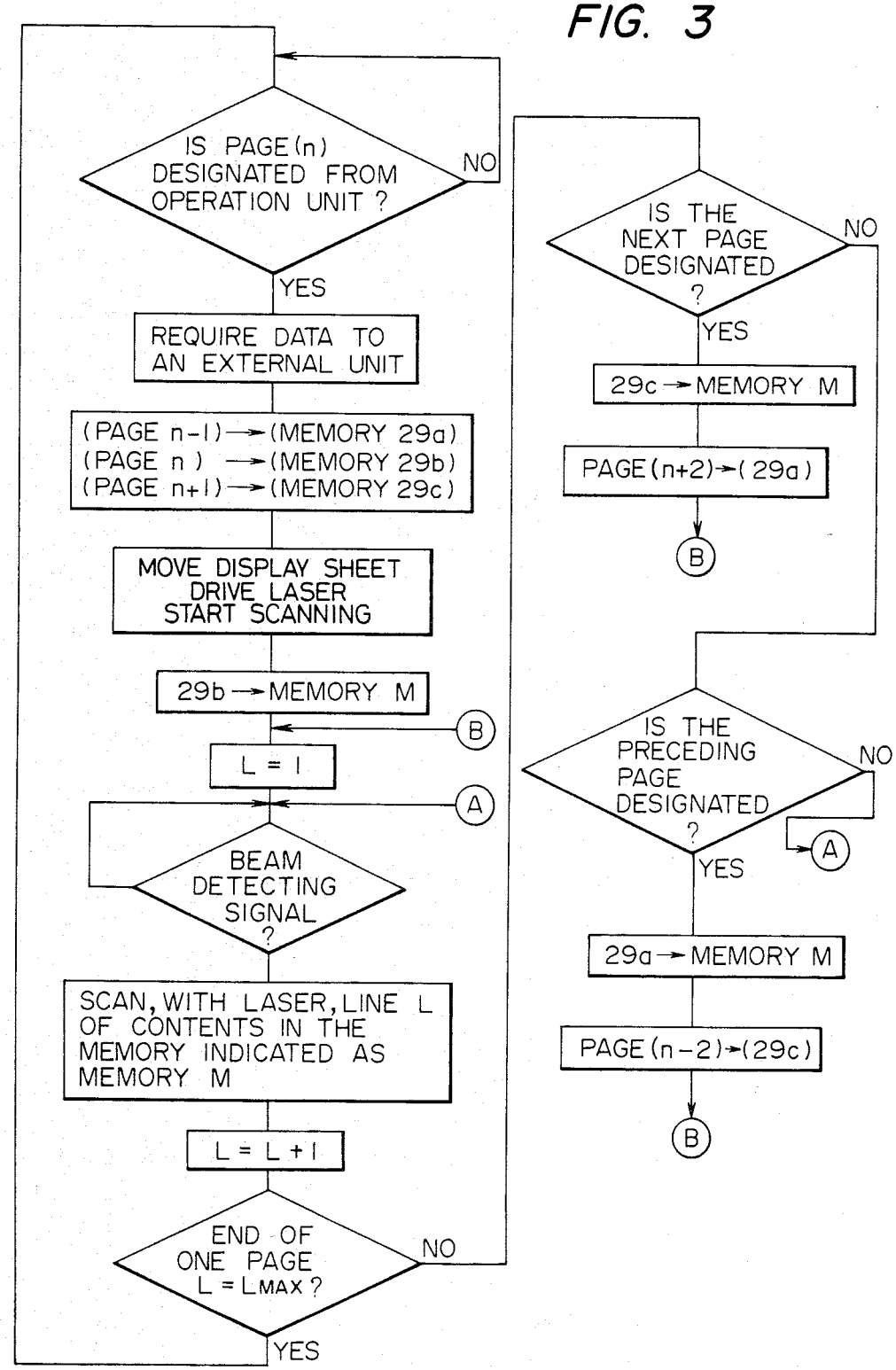
FIG. 3 is a flow chart showing the operation of an embodiment of the present invention.

Operation will now be described by reference to FIG. 3. First, when the user designates the number of a page he wants to see with the operation unit 27, the control circuit 28 demands of the memory unit 30 the image signals of the designated page and the pages before and after the designated page. The image signals input from the memory unit 30 are stored in the buffer memory 29. The buffer memory 29 is provided with three areas 29a, 29b and 29c each having a memory capacity corresponding to one page, and for example, if the designated page is page 50, page 49 is stored in the area 29a, page 50 is stored in the area 29b and page 51 is stored in the area 29c. Subsequently, a display sheet movement signal is sent from the control circuit 28 to the motor driving circuit 26, the brake 25 is released, the motor 24 starts to revolve and the display sheet 5 starts to move. The semiconductor laser 1 emits light and the scanner 2 starts to rotate. A memory M contained in the control circuit 28 memorizes that the page 50 stored in the area 29b of the buffer memory 29 is the designated page. Within a predetermined time after the control circuit 28 receives the beam detector signal from the sensor 9, the laser driving circuit 31 modulates the laser beam of the semiconductor laser 1 by the image signal of the first line of the page 50 stored in the area 29b of the buffer memory 29. Thereby, the visible image of the first line of the page 50 is formed on the display sheet 5. When there is no designation of the succeeding page or the preceding page, the lines are scanned one after another and reproduced into visible images. When the formation of the visible image of the last line of the page 50 is terminated, the semiconductor laser 1 and the scanner 2 stop operating. When the movement of the visible image of the last line therefrom to the lower end of the display portion 17 is detected by the clock pulse from the photointerrupter 23, the control circuit 28 puts out a display sheet stopping signal, whereby the motor 24 is stopped, the brake 25 is applied and the display sheet 5 is stopped.

When the user reads the first several lines of the page 50 whose image is being formed and judges that the page he wants to see is not that page but a succeeding page, the user designates the next page by the operation unit 27. Thus, when the scanning of the line whose image is then being formed is terminated, the fact that the page 51 stored in the area 29c of the buffer memory 29 has been changed to the designated page is immediately stored in the memory M in response to the designation of the next page, and the formation of the image thereof is started. At the same time, the control circuit 28 demands of the memory unit 30 the image signal of page 52 and causes it to be stored in the area 29a of the buffer memory 29. When the preceding page has been designated, the fact that the page 49 stored in the area 29a has been changed to the designated page is stored in the memory M and the formation of the image thereof is started while, at the same time, page 48 is stored in the area 29c.

In this manner, during the formation of the images of one page, the presence of the designation of the preceding or succeeding page is checked for at scanning of each line and when there is such designation, the formation of the images of the one page is stopped and the formation of the designated images of the preceding or succeeding page is started. Therefore, fast feed of the pages can be effected. Accordingly, the search when the number of the page is unknown can be facilitated and thus, the searching time can be shortened. Also, when the designated page has been changed to the preceding or succeeding page, the pages before and after the newly designated page are immediately stored in the buffer memory 29 and therefore, fast feed of multiple pages can be accomplished smoothly.

In the embodiment illustrated, the display speed at which the visible image of one page is formed on the display sheet 5 is supposed to be lower than the speed at which the image signals of one page are input from the memory unit 30 and therefore, the buffer memory 29 is of a three-page memory capacity. However, if these two speeds are the same and the access time required for storing a new page in the memory unit 30 is sufficiently short, the buffer memory 29 may be of a several-line memory capacity. Further, if the scanner 2 has a high operating speed, the buffer memory 29 may be omitted.

Also, during the formation of the images of one page, the presence of the designation of the preceding and succeeding pages is checked for at scanning of each line, but such check-up may be effected within another predetermined cycle, for example, several times per line or once per several lines.

The display device applicable to the present invention is not restricted to that shown in FIG. 1, but any display device can be used. Some examples of the display device also applicable to the present invention are shown in FIGS. 4 to 6.

Figure 4:
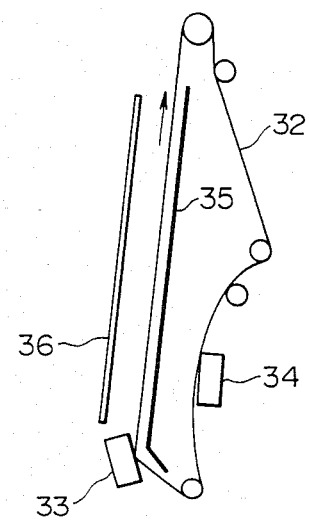
FIGS. 4–6 are schematic views showing further examples of the display device applicable to the output means of the present invention.

The display device of FIG. 4 is of the type in which a visible image is formed on a thermosensitive display sheet 32 by a thermal head 33. The visible image is erased by a cooling unit 34. Reference numeral 35 designates a screen, and reference numeral 36 denotes a protective plate.

Figure 5:
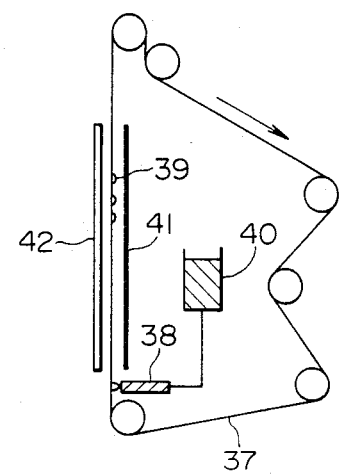

The display device of FIG. 5 is of the type in which transparent liquid drops 39 are deposited from liquid drop discharge means 38 onto a display sheet 37 having a diffusing surface on the back thereof in accordance with image signals so that light transmitted through the liquid drops 39 makes the images visible. Reference numeral 40 designates a tank for the transparent liquid, reference numeral 41 denotes a screen, and reference numeral 42 designates a protective plate.

Figure 6:
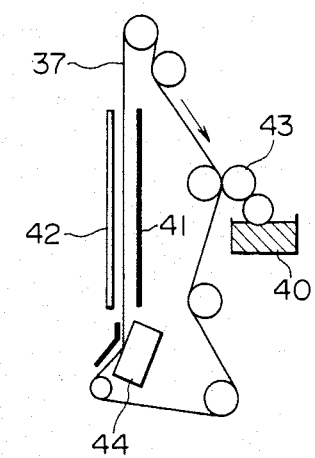
Figure 7:
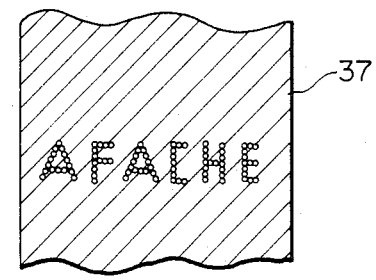
FIG. 7 is a front view showing the display by the display device of FIGS. 5 or 6.

The display device of FIG. 6 is of the type in which the transparent liquid in a tank 40 is predeposited on the whole surface of a display sheet 37 having a diffusing surface on the back thereof by an applicator 43. The transparent liquid is left on the sheet 37 in accordance with image signals and the transparent liquid in other portions of the sheet is removed by a thermal head so that light transmitted through the transparent liquid makes the images visible. The display by the display device of FIG. 5 or 6 is such as shown in FIG. 7.

As the memory unit in the aforedescribed embodiment, use may be made of a so-called disc memory unit in which document information corresponding to multiple pages can be magnetically or optically recorded and reproduced on a disc-like recording medium.

In the present invention, the nature of the image information supply means is not restricted to the above-described memory unit, but may be other memory units, for example, a memory unit in which a plurality of still pictures are stored by video signals. Also, the nature of the memory unit is not restricted, but use may also be made of a unit in which image information is directly sent from an image pickup device. The output means is not restricted to the display device, but a device for putting out image information in the form of electrical signals to a display device or a printer connected to the outside is also covered by the present invention. Further, the present invention is not always comprised of a single apparatus, but may also be comprised of a plurality of apparatuses each having output means, control means, etc. and connected to one another.

What I claim is:

1. An image display apparatus comprising:
   memory means for storing therein information signals representing a plurality of images;
   designating means for selectively designating the information signal representing an image to be displayed from among the information signals stored in said memory means;
   display means for forming a visible image represented by the information signal designated by said designating means, said display means including a display sheet in the form of an endless belt on which the visible image is formed; and
   control means responsive, while said display means is currently forming a visible image represented by a previously designated information signal, to a new designation by said designating means of a new information signal representing a new image to be displayed, for causing said display means to start forming a new visible image represented by the new information signal prior to completion of formation by said display means of the visible image represented by the previously designated information signal.

2. An image display apparatus according to claim 1, wherein said memory means stores therein document information corresponding to a plurality of pages and wherein said apparatus further comprises a buffer memory, for storing the page designated by said designating means and the pages preceding and succeeding said designating page, connected between said memory means and said display means.

3. An image display apparatus according to claim 1, wherein said display means further comprises image forming means for forming images on said display sheet in accordance with image signals, and display sheet driving means for moving said display sheet during image formation and stopping the movement of said display sheet when the image formation is completed.

4. An image display apparatus according to claim 1, wherein said control means detects the production of a designation command by said designating means at a predetermined cycle during the formation of the previously designated image.

* * * * *